United States Patent [19]

Druschke et al.

[11] 4,371,659
[45] Feb. 1, 1983

[54] PREPARATION OF AQUEOUS POLYMER DISPERSIONS HAVING A POLYMER CONTENT OF UP TO 75% BY WEIGHT

[75] Inventors: Wolfgang Druschke, Dirmstein; Albrecht Kerckow, Wachenheim; Bernd Stanger, Dudenhofen, all of Fed. Rep. of Germany

[73] Assignee: Basf Aktiengesellschaft, Ludwigshafen, Fed. Rep. of Germany

[21] Appl. No.: 246,058

[22] Filed: Mar. 20, 1981

[30] Foreign Application Priority Data

Apr. 10, 1980 [DE] Fed. Rep. of Germany ....... 3013812

[51] Int. Cl.$^3$ .............................................. C08L 35/06
[52] U.S. Cl. .................................. 524/599; 523/344; 524/606; 524/831; 526/80; 526/79; 526/82; 526/329.1; 526/329.2
[58] Field of Search .................. 260/29.6 T, 29.6 TA, 260/29.7 W, 29.7 T; 526/329.1, 329.2, 80, 79, 82; 523/344; 524/599, 606

[56] References Cited

U.S. PATENT DOCUMENTS

| | | | |
|---|---|---|---|
| 2,321,759 | 6/1943 | Macht et al. | 260/84 |
| 2,605,257 | 7/1952 | Wolf et al. | 260/80.5 |
| 2,817,648 | 12/1957 | Gould et al. | 260/84.3 |
| 3,248,356 | 4/1966 | Snyder | 260/29.6 |
| 3,365,409 | 1/1968 | Lanthier | 260/29.6 |
| 3,948,867 | 4/1976 | Bader et al. | 260/80 M |
| 4,265,796 | 5/1981 | Mueller-Mall et al. | 260/29.6 R |

*Primary Examiner*—Joseph L. Schofer
*Assistant Examiner*—Bernard Lipman
*Attorney, Agent, or Firm*—Oblon, Fisher, Spivak, McClelland & Maier

[57] ABSTRACT

Aqueous polymer dispersions containing up to 75% by weight of polymer are prepared advantageously by emulsion copolymerization in the presence of conventional anionic emulsifiers, polymerization initiators and small amounts of polymerization inhibitors, at conventional polymerization temperatures, by copolymerizing at least two monomers A, which per se are not copolymerizable with one another, mixed with from 60 to 95% by weight of at least one monomer B, which is copolymerizable with both monomers A, in the presence of a polymerization inhibitor, by the emulsion feed process, wherein (a) the initial aqueous phase at the start of the monomer emulsion feed contains from 0.01 to 0.5% by weight of anionic emulsifier and from 1 to 7% by weight of water-soluble salts, (b) the monomer emulsion contains from 50 to 500 ppm of polymerization inhibitor, (c) from 1 to 10% by weight of the monomer emulsion is added, within the first ½ hour from the start of the feed, at an increasing rate per unit time, to the initial charge and thereafter (d) the remaining monomer emulsion is added in a conventional manner in accordance with the rate of polymerization of the monomers.

7 Claims, No Drawings

PREPARATION OF AQUEOUS POLYMER DISPERSIONS HAVING A POLYMER CONTENT OF UP TO 75% BY WEIGHT

In the conventional monomer emulsion feed processes, an aqueous emulsion of the monomers and, separately but simultaneously, an aqueous solution of additional polymerization initiator, is added at the polymerization temperature, in accordance with the rate of polymerization of the monomers, to an aqueous initial charge which contains polymerization initiator, emulsifiers—in most cases anionic emulsifiers, with or without additional nonionic emulsifiers—and small amounts of buffer salts. The process is used extensively for the preparation of polyacrylate dispersions, polymethacrylate dispersions, vinyl chloride copolymer dispersions, butadiene-styrene copolymer dispersions, vinylidene chloride copolymer dispersions and polyvinyl ester dispersions. The polymerization initiators used are in general water-soluble peroxides, especially ammonium persulfate, sodium persulfate and potassium persulfate, and also redox initiators. The monomers may also contain small amounts of the polymerization inhibitors added for monomer storage. These amounts are in practice generally from 10 to 50 ppm, based on total monomers. The process in general gives aqueous polymer dispersions having a polymer content of from 40 to 60% by weight.

We have found that aqueous polymer dispersions having a polymer content of up to 75% by weight may be prepared by emulsion copolymerization in the presence of conventional anionic emulsifiers, polymerization initiators and small amounts of polymerization inhibitors, at conventional polymerization temperatures, by copolymerizing at least two monomers A, which per se are not copolymerizable with one another, mixed with from 60 to 95% by weight, based on total monomers, of at least one monomer B, which are copolymerizable with both monomers A, in the presence of a polymerization inhibitor, by the emulsion feed process, wherein (a) the initial aqueous phase at the start of the monomer emulsion feed contains from 0.01 to 0.5% by weight, based on the initial charge, of anionic emulsifier and from 1 to 7% by weight, based on the initial charge, of water-soluble salts, (b) the monomer emulsion contains from 50 to 500 ppm, based on total monomers, of polymerization inhibitor, (c) from 1 to 10% by weight of the monomer emulsion is added, within the first ½ hour from the start of the feed, at an increasing rate per unit time, to the initial charge and thereafter (d) the remaining monomer emulsion is added in a conventional manner in accordance with the rate of polymerization of the monomers.

It is surprising that particularly concentrated polymer dispersions, containing, for example, from 70 to 75% by weight of polymer, based on the dispersion, can be obtained, using two monomers A which per se are not copolymerizable with one another, if monomers B are used as an entraining agent and the polymerization is carried out under conditions which lead to a substantial retardation of the rate of polymerization in the initial stage. Such conditions include low amounts of emulsifier, an initial high salt content of the aqueous phase, and the use of polymerization inhibitors in relatively large amounts, larger than those conventionally used to stabilize the monomers for storage. It is also surprising that in the novel process very concentrated dispersions can be obtained only if, in accordance with (c), a small proportion of the monomer emulsion is, to start with, added particularly slowly, and at an increasing rate, to the initial charge.

The conventional free radical-forming organic or inorganic polymerization initiators can be employed in the novel process. Those of particular interest are water-soluble persulfates, such as ammonium persulfate, sodium persulfate and potassium persulfate, as well as redox initiators, for example mixtures of such persulfates or of hydrogen peroxide with reducing agents, such as sodium bisulfate, ascorbic acid or sodium hydroxymethanesulfinate.

Suitable anionic emulsifiers which are preferably present in the initial charge in amounts of from 0.1 to 0.4% by weight, based on the initial charge, and are present in the monomer feed in amounts of, generally, from 0.5 to 3, preferably from 0.6 to 1.2, % by weight, based on total monomers, are in particular sodium laurylsulfate, sodium $C_{11}$-$C_{17}$-alkylsulfonate, sodium $C_8$-$C_{12}$-alkyl-arylsulfonate and the sodium salts of sulfuric acid half-esters of oxyethylated $C_8$-$C_{18}$-alkanols.

In addition, nonionic emulsifiers, such as lauryl alcohol oxyethylated with from 2 to 20 moles of ethylene oxide, and alkylaryloxyethylates, may be present, in amounts of 0–2% by weight, based on monomers. The water-soluble salts employed in the initial charge are mostly polyelectrolytes which also serve as buffers, ie. mixtures of primary, secondary and tertiary alkali metal phosphates and ammonium phosphates, but other salts which may be used are sodium pyrophosphate, sodium ethylenediaminetetraacetate, and also sodium chloride, sodium bicarbonate, calcium sulfate, magnesium sulfate, calcium chloride, magnesium chloride, ammonium chloride and/or sodium sulfate.

The polymerization inhibitors used can be the substances also employed to prevent undesirable polymerization on storage of monomers. Hydroquinone, hydroquinone monomethyl ether, t-butylpyrocatechol and phenothiazine have proved particularly suitable.

Suitable monomers A are in particular vinyl acetate, styrene, methyl methacrylate, acrylonitrile, vinyl chloride, vinylidene chloride, butadiene and vinyl propionate. Certain combinations of two of these monomers are known to give copolymers in aqueous emulsion, for example butadiene/styrene, butadiene/methyl methacrylate and methyl methacrylate/styrene. On the other hand, the two-monomer combinations vinyl acetate/styrene, methyl methacrylate/vinyl acetate, vinyl chloride/butadiene, vinyl chloride/styrene, methyl methacrylate/vinyl propionate, vinylidene chloride/butadiene, vinylidene chloride/vinyl acetate and vinylidene chloride/methyl methacrylate are difficult to convert to copolymers in aqueous emulsion. In certain cases, mixtures of homopolymers are formed, with the reaction taking place very slowly, and in many cases, for example in the case of styrene/vinyl acetate, the polymerization stops entirely. In the case of such combinations of the monomers A, the copolymerization reactivity ratios $r_1$ and $r_2$ are accordingly very different, with at least one of the two reactivity ratios being $>1$. On the other hand, the said combinations of the monomers A readily copolymerize, in aqueous emulsion, with acrylic acid esters, especially esters of straight-chain or branched alkanols of 1 to 12 carbon atoms. Such monomers which are readily copolymerizable with the monomers A are referred to, for the purposes of the present invention, as monomers B. In other words, in the novel process, the monomers A are employed in combinations which have unfavorable copolymerization reactivity ratios, but are mixed with monomers B which show favorable copolymerization reactivity ratios with the monomers A. In the novel process, it is also possible to employ 3 or more monomers A and 2 or more monomers B.

In addition, it is possible to employ, in the novel process, from 0 to 10, and often with advantage from 0.5 to 5, percent by weight, based on total monomers, of comonomers C which possess reactive groups and, when polymerized alone, mostly give water-soluble homopolymers. Examples of such comonomers C are $\alpha,\beta$-monoolefinically unsaturated monocarboxylic acids and dicarboxylic acids and amides, which may or may not be substituted at the nitrogen, eg. acrylic acid, methacrylic acid, crotonic acid, fumaric acid, itaconic acid, acrylamide, methacrylamide, N-methylolacrylamide, N-methylolmethacrylamide, N-methoxymethylacrylamide, N-n-butoxymethylmethacrylamide and N-methylacrylamide, as well as vinylsulfonic acid and its water-soluble salts. Examples of monomers C also include other acrylic acid esters and methacrylic acid esters, mostly derived from alkanediols of 2 to 8 carbon atoms, eg. butane-1,4-diol monoacrylate and monomethacrylate and ethylene glycol monoacrylate and monomethacrylate, as well as ethylene glycol diacrylate and butane-1,4-diol diacrylate and dimethacrylate.

In introducing the 1-10% by weight of monomer emulsion in the course of ½ an hour, it is possible to start from a feed rate of a few liters/hour, for example 50-100 liters/hour, or a higher rate, for example 500-1,000 liters/hour, and to increase this rate either only a little, for example by 10-50%, or by a great deal, for example to twice or 3 times the initial rate or, especially if a low feed rate was used to start with, up to 100 times the initial rate. For example, it has proved advantageous to increase rates of 500-900 liters/hour to 1,500-2,200 liters/hour. In some cases it is also advantageous to effect an increase from, for example, 50-100 liters/hour to 1,000-2,500 liters/hour within the first half hour from the start of the feed.

The polymerization temperature is in general 40°-150° C., e.g., if free-radical catalysts of the potassium persulfate type are used, the temperature is 50°-130° C., especially 60°-90° C., whilst it is 5°-40° C. if conventional redox catalysts are employed. The amount of polymerization initiator used lies within the conventional range, ie. from 0.05 to 3, preferably from 0.1 to 0.6, % by weight, based on monomers.

Using the novel process, it is possible to obtain very concentrated polymer dispersions, in which the polymer content is, for example, from 65 to 75%.

In the Examples which follow, parts and percentages are by weight.

EXAMPLE 1

493.5 parts of water, 14.1 parts of sodium pyrophosphate, 7.0 parts of sodium ethylenediaminetetraacetate and 3.5 parts of a 40% strength aqueous Na $C_{12}$–$C_{16}$-alkylsulfonate solution are mixed thoroughly in a stirred pressure kettle. After heating the mixture to 80° C., a slurry of 3.5 parts of sodium persulfate in 47 parts of water is added.

The following monomer emulsion (feed I) is prepared beforehand in a feed vessel:
1,269.0 parts of water;
112.8 parts of a 35% strength solution of the Na salt of the sulfuric acid half-ester of oxyethylated p-n-nonylphenol (25 ethylene oxide units);
3.5 parts of t-dodecylmercaptan;
36.3 parts of acrylic acid (97% strength);
5,640.0 parts of 2-ethylhexyl acrylate;
564.0 parts of vinyl acetate;
564.0 parts of methyl methacrylate;
282.0 parts of styrene;
3.5 parts of hydroquinone smonomethyl ether.

A solution of 52.8 parts of sodium persulfate in 705 parts of water (feed II) is kept ready in a further feed vessel. To the initial charge, kept at 80° C. in the stirred kettle, feed I is next added slowly, starting with a rate of 700 l/hour and increasing, in the course of ½ an hour, to 1,900 l/hour.

The remainder of feed I is introduced into the stirred kettle in the course of a further 4.5 hours. Simultaneously with feed I, feed II is introduced into the stirred kettle at a uniform rate, over 5 hours. When all of feeds I and II have been added, the kettle is kept at 80° C. for a further hour and is then cooled. A 70% strength polymer dispersion which is free from coagulate and specks and which is useful as a raw material for pressure-sensitive adhesives, is obtained.

EXAMPLE 2

The procedure described in Example 1 is followed, but using, in feed I, 5,640 parts of n-butyl acrylate instead of 2-ethylhexyl acrylate and 10.6 parts of 6-butylpyrocatechol instead of hydroquinone monomethyl ether. A 70% strength coagulate-free and speck-free polymer dispersion, which is useful as a binder for nonwovens, is obtained.

EXAMPLE 3

The procedure described in Example 1 is followed, but the 564 parts of methyl methacrylate in feed I are replaced by vinyl acetate, so that in total 1,128 parts of vinyl acetate are employed. A 70% strength coagulate-free and speck-free dispersion, which is useful as a raw material for adhesives, is obtained.

EXAMPLE 4

The procedure described in Example 1 is followed, but only 2,820 parts of 2-ethylhexyl acrylate are used, with an additional 2,820 parts of n-butyl acrylate. A 70% strength coagulate-free and speck-free polymer dispersion is obtained, which is useful for the preparation of sealants.

EXAMPLE 5

The procedure described in Example 1 is followed, but instead of styrene the same amount of acrylonitrile is used. A 70% strength polymer dispersion which is free from coagulate and specks and which is useful as a raw material for pressure-sensitive adhesives is obtained.

EXAMPLE 6

The procedure described in Example 1 is followed, but the materials employed differ as follows: in the stirred kettle, 18 parts of sodium pyrophosphate and 3.5 parts of Na ethylenediaminetetraacetate are used. In the feed vessel, the following monomer emulsion is prepared (feed I):
1,269.0 parts of water;

112.8 parts of a 35% strength solution of the Na salt of the sulfuric acid half-ester of oxyethylated p-n-nonylphenol (12 ethylene oxide units);
3.5 parts of t-dodecylmercaptan;
36.3 parts of acrylic acid (97% strength);
6,486.0 parts of ethyl acrylate;
282.0 parts of styrene;
282.0 parts of vinyl chloride;
1.0 part of hydroquinone monomethyl ether.

A 70% strength coagulate-free and speck-free polymer dispersion is obtained, which is useful for the preparation of sealants.

EXAMPLE 7

The procedure described in Example 1 is followed, but the materials employed differ as follows: in the stirred kettle, 18 parts of sodium pyrophosphate and 14 parts of Na ethylenediaminetetraacetate are used. Furthermore, instead of 3.5 parts of 40% strength aqueous Na alkylsulfonate solution, only 1.5 parts are used.

In the feed vessel, the following monomer emulsion is prepared (feed I):
1,290.0 parts of water;
225.0 parts of a 15% strength aqueous solution of sodium lauryl-sulfate;
3.5 parts of dodecylmercaptan;
36.3 parts of acrylic acid (97% strength);
3,243.0 parts of methyl acrylate;
3,243.0 parts of n-butyl acrylate;
282.0 parts of methyl methacrylate;
282.0 parts of vinylidene chloride;
2.0 parts of t-butyl-pyrocatechol.

A 70% strength coagulate-free and speck-free dispersion, which is useful as a raw material for adhesives, is obtained.

EXAMPLE 8

The procedure described in Example 1 is followed, but the materials employed differ as follows: in the stirred kettle, 20 parts of sodium pyrophosphate and 10 parts of Na ethylenediaminetetraacetate are used. In the feed vessel, the following monomer emulsion is prepared (feed I):
1,269.0 parts of water;
280.0 parts of a 20% strength aqueous solution of the Na salt of the sulfuric acid half-ester of an adduct of lauryl alcohol with 12 moles of ethylene oxide;
3.5 parts of t-dodecylmercaptan
36.3 parts of acrylic acid (97% strength);
6,486.0 parts of 2-ethylhexyl acrylate;
282.0 parts of butadiene;
1.0 part of hydroquinone monomethyl ether.

A 70% strength coagulate-free and speck-free dispersion, which is useful in the pressure-sensitive adhesives sector, is obtained.

We claim:

1. In a process for the preparation of aqueous polymer dispersions containing up to 75% by weight of polymer by emulsion copolymerization in the presence of conventional anionic emulsifiers, polymerization initiators and small amounts of polymerization inhibitors at conventional polymerization temperatures, the improvement comprising:
copolymerizing a monomer combination selected from the group consisting of vinyl acetate/styrene, methyl methacrylate/vinyl acetate, vinyl chloride/butadiene, vinyl chloride/styrene, methyl methacrylate/vinyl propionate, vinylidene chloride/butadiene, vinylidene chloride/vinyl acetate and vinylidene chloride/methyl methacrylate mixed with from 60 to 95% by weight, based on the total monomers, of at least one monomer B which is copolymerizable with said monomer combination, in the presence of a polymerization initiator, by the emulsion feed process, under conditions such that (a) the initial aqueous phase at the initiation of monomer emulsion feeding contains from 0.01 to 0.5% by weight, based on the initial charge, of anionic emulsifier and from 1 to 7% by weight, based on the initial charge, of water soluble salts, (b) the monomer emulsion contains from 50 to 500 ppm, based on the total monomers, of polymerization inhibitor, (c) from 1 to 10% by weight of the monomer emulsion is added, within the first ½ hour from initiation of emulsion feeding, at an increasing rate of the initial charge, and thereafter (d) the remaining monomer emulsion is added at a rate sufficient to control the rate of reaction.

2. The process of claim 1, wherein said monomer B is a member selected from the group consisting of acrylic acid esters of alkanols of 1 to 12 carbon atoms.

3. The process of claim 1, wherein said combination of monomers further comprises at least one monomer selected from the group consisting of $\alpha,\beta$-monoolefinically unsaturated monocarboxylic acids, $\alpha,\beta$-monoolefinically unsaturated dicarboxylic acids, amides of these acids, and esters of acrylic acid and methacrylic acid with alkanediols of 2 to 8 carbon atoms.

4. A process for producing an aqueous polymer dispersion, which comprises:
emulsion copolymerizing 40-5% by wt. of a monomer combination selected from the group consisting of vinyl acetate/styrene, methyl methacrylate/vinyl acetate, vinyl chloride/butadiene, vinyl chloride/styrene, methyl methacrylate/vinyl propionate, vinylidene chloride/butadiene, vinylidene chloride/vinyl acetate and vinylidene chloride/methyl methacrylate with from 60-90% by wt. based on the total monomers, of at least one monomer B which is copolymerizable with said monomer combination by the emulsion feed process, wherein said polymerization occurs between combination and monomer B in an emulsion containing from 50 to 500 ppm of inhibitor, and wherein from 1-10% by wt. of an initial charge of monomer emulsion is initially introduced into the reaction vessel at an increasing rate over the first one-half hour of addition with the remainder of the monomer mixture being added to said vessel at a rate sufficient to control the reaction.

5. The process of claim 4, wherein said monomer emulsion contains from 0.01 to 0.5% by wt. of anionic emulsifier and from 1 to 7% by wt. of water soluable salts.

6. The process of claim 4, wherein said monomer emulsion contains from 0.5 to 5% by wt. of total monomers of at least one additional monomer, which, if polymerized alone, produces water soluble homopolymers.

7. In a process for the preparation of aqueous polymer dispersions containing up to 75% by wt. of polymer by emulsion compolymerization in the presence of conventional anionic emulsifiers, polymerization initiators and small amounts of polymerization inhibitors, at conventional polymerization temperatures, the improvement comprising:

copolymerizing a monomer combination selected from the group consisting of vinyl acetate/styrene, methyl methacrylate/vinyl acetate, vinyl chloride/butadiene, vinyl chloride/styrene, methyl methacrylate/vinyl propionate, vinylidene chloride/butadiene, vinylidene chloride/vinyl acetate and vinylidene chloride/methyl methacrylate mixed with from 60 to 95% by wt., based on the total monomers, of at least one monomer B which is copolymerizable with said monomer combination in the presence of a polymerization inhibitor, by the emulsion feed process, under the conditions such that (A) the initial aqueous phase at the start of the monomer emulsion feed contains from 0.01 to 0.5% by wt., based on the initial charge, of anionic emulsifier and from 1 to 7% by wt., based on the initial charge, of water soluble salts, (B) the monomer emulsion containing from 50 to 500 ppm based on the total monomers, of polymerization inhibitor, (C) from 1–10% by by wt. of monomer emulsion is added, within the first one-half hour from the initiation of the monomer feed, at an increasing rate, to the initial charge and thereafter (B) the remaining monomer emulsion being added at a rate sufficient to control the rate of reaction.

* * * * *